United States Patent Office 2,956,091
Patented Oct. 11, 1960

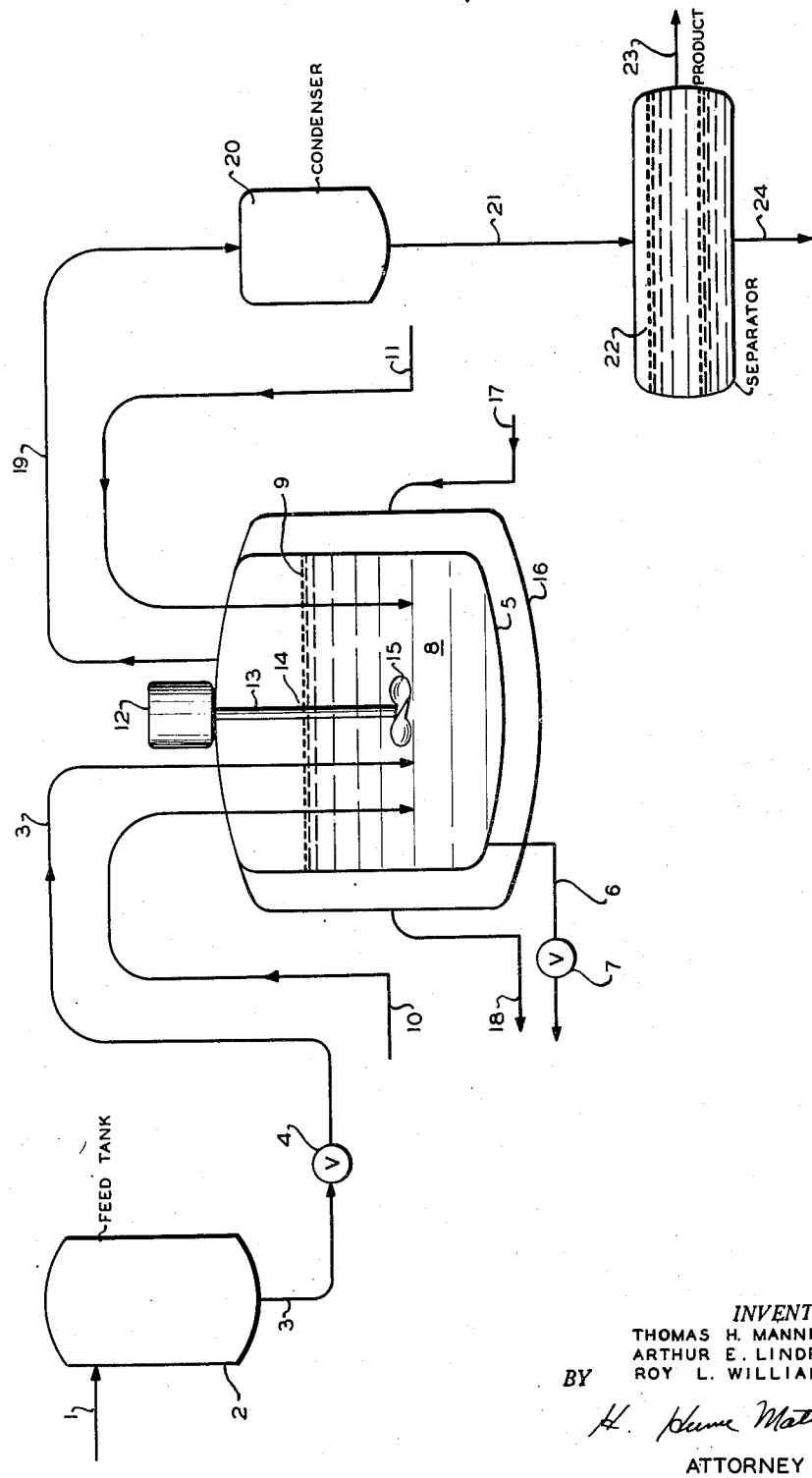

2,956,091

METHOD OF DEHYDRATING ACETYLENIC COMPOUNDS

Thomas H. Manninen, Summit, Arthur E. Lindroos, Westfield, and Roy L. Williams, Millington, N.J., assignors to Air Reduction Company, Incorporated, New York, N.Y., a corporation of New York Filed Feb. 1, 1957, Ser. No. 637,686

5 Claims. (Cl. 260—678)

This invention relates to the dehydration of acetylenic alcohols and acetylenic glycols and, in one of its more specific aspects, to the production of diisospropenyl acetylene by the catalytic dehydration of 2,5-dimethyl-3-hexyne-2,5-diol.

Heretofore, it has generally been the practice in the dehydration of certain acetylenic compounds, such as 2,5-dimethyl-3-hexyne-2,5-diol, to heat a batch of the same in the presence of a catalyst in a reactor and condense the resultant vapors. This procedure has been inefficient and objectionable for several reasons. For one thing, due to the fact that diisopropenyl acetylene is soluble in 2,5-dimethyl-3-hexyne-2,5-diol and due to the extended residence time of the diisopropenyl acetylene in the reactor, the yields thereof are low. Also, the contents of the reactor eventually become viscous and tar-like, due to polymer formation, and have to be discarded.

The method of this invention effectively overcomes or substantially minimizes the difficulties experienced in the past. It provides a continuous procedure for dehydrating acetylenic materials on an economical commercial basis. Our method results in higher yields of desirable end products. The conditions under which the method is carried out are such that reaction takes place very quickly, i.e., practically instantly, and evolved vapors are promptly removed and condensed, thereby avoiding substantial polymerization and other undesirable side reactions.

This invention has for a principal object the provision of an improved method of dehydrating acetylenic materials of the character indicated.

Another object of this invention is to obtain increased and economical yields of dehydrated acetylenic products, such as isopropenyl acetylene and diisopropenyl acetylene by the catalytic dehydration of commercially available 3-methyl-1-butyne-3-ol and 2,5-dimethyl-3-hexyne-2,5-diol, respectively.

Additional objects, together with the advantages of the invention, will be apparent to persons versed in the art from the detailed description that follows and the annexed drawing which illustrates diagrammatically a system of apparatus for practicing the method of the invention.

To the end that the foregoing objects may be readily attained, in a preferred and recommended method of producing a dehydrated acetylenic material, for example, producing diisopropenyl acetylene by dehydrating 2,5-dimethyl-3-hexyne-2,5-diol, a stream of liquid 2,5-dimethyl-3-hexyne-2,5-diol is transmitted into and below the surface of a body of an inert liquid reaction medium in a closed reaction zone. The reaction medium preferably consists of a suitable liquid base composition having a dehydration catalyst incorporated therein. The reaction medium is maintained at an elevated temperature and is agitated, by stirring, to effect intimate contact of the medium with the 2,5-dimethyl-3-hexyne-2,5-diol transmitted thereinto. The 2,5-dimethyl-3-hexyne-2,5-diol reacts very quickly, that is to say, virtually instantly with the reaction medium whereby the 2,5-dimethyl-3-hexyne-2,5-diol is dehydrated and vapor comprising diisopropenyl acetylene is flashed off in the reaction zone. The feed of 2,5-dimethyl-3-hexyne-2,5-diol is preferably maintained at a rate equivalent to the reaction rate so that there is little or no accumulation of material in the reaction vessel. The vapor is immediately and continuously removed from the reaction zone and condensed. The condensate is then separated into two phases, namely an organic phase and an aqueous phase. The organic phase contains a major amount of diisopropenyl acetylene and minor amounts of impurities, which may consist of the reaction medium and side reaction products. The aqueous phase contains water, which is one of the dehydration products of the 2,5-dimethyl-3-hexyne-2,5-diol, and any other material which may be present in the reaction medium itself, its decomposition products, or some unreacted 2,5-dimethyl-3-hexyne-2,5-diol.

The stream of starting material, which is transmitted into and treated in the reaction zone, preferably consists of commercially available granular 2,5-dimethyl-3-hexyne-2,5-diol which has been rendered molten or liquid by the application of heat or by the mere addition of a sufficient amount of water. The use of water may, under certain circumstances, be more economical than the use of heat alone. Some of the added water is converted at the time of reaction into steam which aids in driving off and removing vapor products of the reaction.

The reaction medium, as stated earlier herein, consists of a liquid base composition having a dehydration catalyst incorporated therein. The base composition may comprise any material which is in a liquid state at the reaction temperature and pressure conditions. We prefer and recommend inert base compositions, but find that base compositions which undergo reaction to a limited extent may be used, provided that the products of such reaction may be readily removed from the desired end product. Among base compositions which may be advantageously employed in the practice of our method are various inert organic liquids, including a petroleum product which is available under the trade name "Nujol," a compound of diphenyl and diphenyl oxide which is available under the trade name "Dowtherm A," kerosene, a refined petroleum which is available under the trade name "Esso Mentor" No. 28 oil, diethylene glycol, and other polyethylene glycols, such as triethylene glycol. These base compositions are representative of many other compositions which are suitable for the purposes of this invention.

Any dehydration catalyst known to the art, which may be conveniently incorporated in the base composition by suspending or dissolving the catalyst therein and which remains incorporated in the base composition under reaction conditions, may be used. Specific catalysts which have been employed with entirely satisfactory results include "Super Filtrol" which is the trade name of a commercially available acid-activated montmorillonite clay, and paratoluene sulphonic acid. Other catalysts which can be used include ammonium sulfate, phosphoric acid, and the like. The catalysts can be extended by admixture with inert, particulate carriers such as diatomaceous earth or activated alumina. The catalyst concentration is dependent to a large extent on the temperature of the reaction medium at the time of reaction, and the amount may vary from 2% to 30% by weight of the reaction medium and, for best results, from 4% to 10% by weight.

The temperature at which the reaction medium is maintained at the time of reaction is an important factor. The temperature of the reaction medium may vary from 130° C. to 200° C. and, for best results, should be within the range of 160° C. to 180° C. If the temperature of the reaction medium is below 130° C., the yields are too low from a commercial viewpoint. If the temperature of the reaction medium exceeds 200° C., excessive amounts of polymerization and side reaction products are formed, correspondingly decreasing the yields of desired end products.

We find that the formation of polymers at the indicated reaction temperatures may be minimized by removing resultant vapors from the reaction zone immediately after reaction. Therefore, no reflux from the vapors leaving the reaction zone is permitted. As an aid in sweeping reaction products from the reaction zone, nitrogen or other inert gas such as steam, or the like, can be introduced into the reaction zone above or below the surface of the reaction mass. The nitrogen or other gas so introduced not only assists in sweeping out reaction products but also assures maintenance of an inert atmosphere in the reaction zone.

The system of apparatus illustrated in the drawing will now be described, having regard to the use thereof in the production of diisopropenyl acetylene by the catalytic dehydration of 2,5-dimethyl-3-hexyne-2,5-diol according to the invention. Conduit 1 transmits liquid 2,5-dimethyl-3-hexyne-2,5-diol from a source of supply (not shown) into a feed tank 2. The 2,5-dimethyl-3-hexyne-2,5-diol is transmitted from the feed tank by a conduit 3, having a combined control and metering valve 4, into a closed vessel 5 which constitutes the reaction zone. A conduit 6 having a control valve 7 communicates with the bottom of vessel 5 and permits drainage thereof as required.

A body of the liquid reaction medium 8 is contained in vessel 5 and its level is indicated by numeral 9. The initial amount of the reaction medium and additional quantities of the reaction medium, which may be required from time to time for make-up purposes, are supplied by a conduit 10 which is connected to a source (not shown). A stream of the inert gas, for sweeping out reaction products and for assuring maintenance of an inert atmosphere in the vessel, is admitted by way of a conduit 11. As shown, each of conduits 3, 10 and 11, discharges directly into and below the surface of the reaction medium.

Mounted on and above vessel 5 is an electric motor 12 having a depending rotary shaft 13 which projects into the reaction vessel and terminates below the level of the reaction medium. The shaft is provided with a tubular housing 14 to prevent whipping in operation and carries an agitator blade 15 at its lower end. It will be observed that the discharge end of conduit 3 is located adjacent to blade 15 whereby rotation of the blade with shaft 13 stirs the reaction medium and effects intimate contact and dispersion of the 2,5-dimethyl-3-hexyne-2,5-diol with the reaction medium.

An outer shell 16 is coaxial with vessel 5 and is spaced from the side and bottom walls of the vessel, as shown. A suitable heating fluid is circulated through the space defined by the vessel and the shell, being admitted thereinto by a conduit 17 and discharged therefrom by a conduit 18. The heating fluid heats the reaction medium by heat exchange whereby the reaction medium is maintained at a reaction temperature between 130° C. and 200° C. and preferably between 160° C. and 180° C., as stated earlier herein. The 2,5-dimethyl-3-hexyne-2,5-diol reacts very quickly with the reaction medium, and vapor, comprising diisopropenyl acetylene, is flashed off in the vessel. The vapor is immediately withdrawn from the vessel by way of a conduit 19 and transmitted into a condenser 20 wherein it is condensed. The condensate is transmitted by a conduit 21 into a separator 22 in which it is separated into an organic phase and an aqueous phase. The organic phase contains a major amount of diisopropenyl acetylene and a minor amount of water-soluble impurities. Organic phase material is withdrawn from the separator by way of a conduit 23 while accumulated aqueous phase material is removed by way of a conduit 24.

The following examples are illustrative of the utility of the method of this invention:

*Example 1*

Diisopropenyl acetylene was produced by catalytically dehydrating 2,5-dimethyl-3-hexyne-2,5-diol in accordance with this invention. The reaction medium was maintained at a temperature of approximately 170° C. and consisted of Esso Mentor No. 28 oil with 4% by weight of Super Filtrol Grade I suspended therein as the catalyst. This yielded organic phase products containing 85% diisopropenyl acetylene in a yield of 65%. In other words, 65% of 2,5-dimethyl-3-hexyne-2,5-diol was converted to diisopropenyl acetylene and the recovered organic phase products analyzed 85% diisopropenyl acetylene.

*Example 2*

Diisopropenyl acetylene was produced from 2,5-dimethyl-3-hexyne-2,5-diol under the same conditions as Example 1 above, except that diethylene glycol was used in place of Esso Mentor No. 28. The organic phase products contained 85% diisopropenyl acetylene with a yield of 90%.

The difference in yields in the above examples, namely 65% yield in Example 1 and 90% yield in Example 2, is believed to be due to the fact that diisopropenyl acetylene is soluble in Esso Mentor No. 28 oil at the reaction temperature and is therefore held back by the reaction medium, whereas diisopropenyl acetylene is substantially insoluble in diethylene glycol at the reaction temperature and is not held back by the reaction medium. Although diethylene glycol is a material which can normally be dehydrated, under the conditions of our method it does not react or become dehydrated to an appreciable extent.

While the invention has been described in detail with specific examples, such examples are illustrative and are not given as limitations since the invention is applicable to the catalytic dehydration of various acetylenic alcohols and acetylenic glycols, including the catalytic dehydration of 3-methyl-1-butyne-3-ol in the production of isopropenyl acetylene. Therefore, various changes may be made in the apparatus employed and in the details of procedure without departing from the invention or sacrificing any of its advantages, it being understood that all matter contained herein shall be interpreted as being illustrative and explanatory, rather than in a limiting sense.

We claim:

1. The method of dehydrating a material selected from the group consisting of acetylenic alcohol and acetylenic glycol to form therefrom a dehydrated acetylenic compound which comprises continuously introducing a stream of the said material in liquid phase below the surface of a volume of a reaction medium maintained at a temperature between 130° C. and 200° C. in a closed reaction zone, said reaction medium consisting of a polyethylene glycol and a dehydration catalyst, limiting the rate of feed of said material to said reaction medium to a rate not exceeding the dehydration reaction rate in said medium, continuously agitating said reaction medium as said material to be dehydrated is introduced to cause said dehydration reaction to take place substantially instantaneously and form reaction products that are volatile at the temperature of the reaction medium, continuously introducing a purge gas into said reaction zone to entrain substantially all of said volatile dehydration products, immediately upon formation removing substantially all of said products and the purge gas in which they are entrained from said reaction zone, condensing said removed volatile reaction products and separating the dehydrated material from the condensate.

2. A process for the preparation of diisopropenyl acetylene which comprises continuously introducing a stream of 2,5-dimethyl-3-hexyne-2,5-diol in liquid phase below the surface of a volume of a reaction medium consisting of a polyethylene glycol and a dehydration catalyst maintained at a temperature between 130° C. and 200° C. in a closed reaction zone, the rate of introduction of said 2,5-dimethyl-3-hexyne-2,5-diol into said reaction medium not exceeding the dehydration reaction rate, continuously agitating said reaction medium as said 2,5-dimethyl-3-hexyne-2,5-diol is introduced to thereby cause substantially all of said 2,5-dimethyl-3-hexyne-2,5-diol to react to form volatile dehydration products including diisopropenyl acetylene substantially instantaneously upon introduction to said reaction medium, continuously introducing a purge gas into said reaction zone to entrain substantially all of said volatile dehydration products, immediately upon formation removing said volatile dehydration products and the purge gas in which they are entrained from said reaction zone, condensing said volatile reaction products and separating therefrom the diisopropenyl acetylene so produced.

3. A process for the preparation of diisopropenyl acetylene which comprises continuously introducing a stream of 2,5-dimethyl-3-hexyne-2,5-diol in liquid phase below the surface of a volume of a reaction medium consisting of diethylene glycol and a dehydration catalyst maintained at a temperature between 160° C. and 180° C. in a closed reaction zone, the rate of introduction of said 2,5-dimethyl-3-hexyne-2,5-diol into said reaction medium not exceeding the dehydration reaction rate, continuously agitating said reaction medium as said 2,5-dimethyl-3-hexyne-2,5-diol is introduced to thereby cause substantially all of said 2,5-dimethyl-3-hexyne-2,5-diol to react to form volatile dehydration products including diisopropenyl acetylene substantially instantaneously upon introduction to said reaction medium, continuously introducing a purge gas into said reaction zone to entrain substantially all of said volatile dehydration products, immediately upon formation removing said volatile dehydration products and the purge gas in which they are carried from said reaction zone, condensing said volatile reaction products and separating therefrom the diisopropenyl acetylene so produced.

4. A process for the preparation of isopropenyl acetylene which comprises continuously introducing a stream of 3-methyl-1-butyne-3-ol in a liquid phase below the surface of a volume of a reaction medium consisting of a polyethylene glycol and a dehydration catalyst, said reaction medium maintained at a temperature between 130° C. and 200° C. in a closed reaction zone, the rate of introduction of said 3-methyl-1-butyne-3-ol into said reaction medium not exceeding the dehydration rate, continuously agitating said reaction medium as said 3-methyl-1-butyne-3-ol is introduced to thereby cause substantially all of said 3-methyl-1-butyne-3-ol to react to form volatile dehydration products including isopropenyl acetylene substantially instantaneously upon introduction to said reaction medium, continuously introducing a purge gas into said reaction zone to entrain substantially all of said volatile dehydration products, immediately upon formation removing said volatile dehydration products and the purge gas in which they are carried from said reaction zone, condensing said volatile reaction products and separating therefrom the isopropenyl acetylene so produced.

5. The process of claim 4 wherein the polyethylene glycol is diethylene glycol.

References Cited in the file of this patent
UNITED STATES PATENTS

| | | |
|---|---|---|
| 2,250,558 | Vaughn | July 29, 1941 |
| 2,371,530 | Lorch | Mar. 13, 1945 |
| 2,371,634 | Lorch | Mar. 20, 1945 |
| 2,737,537 | Taylor et al. | Mar. 6, 1956 |